Patented Dec. 20, 1932

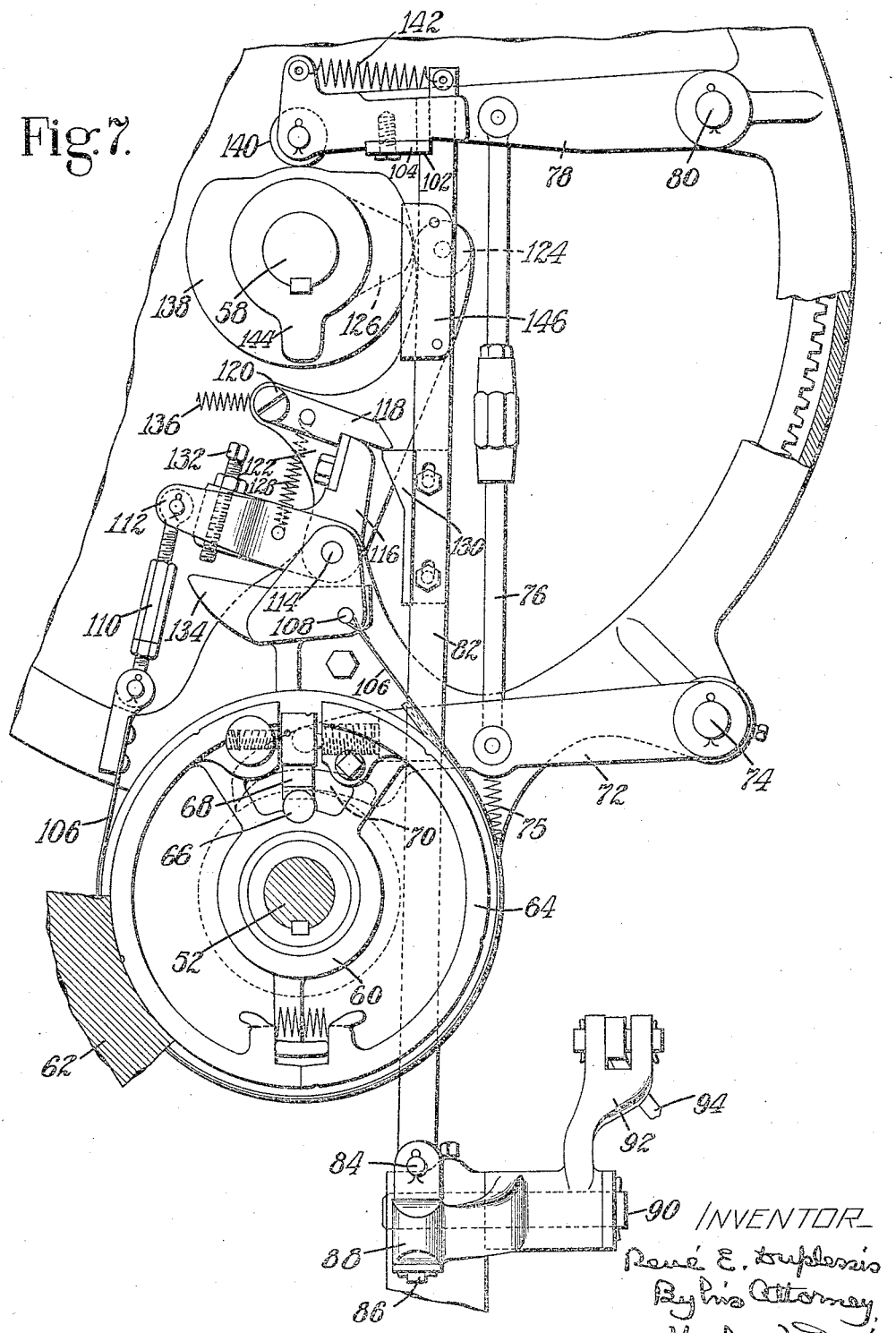

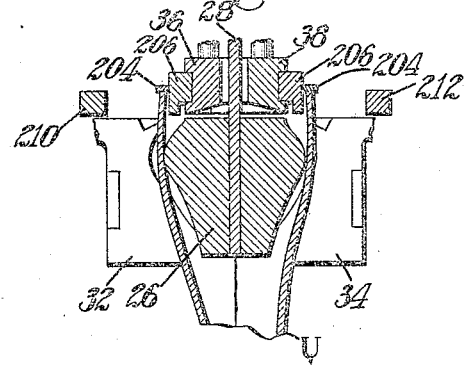
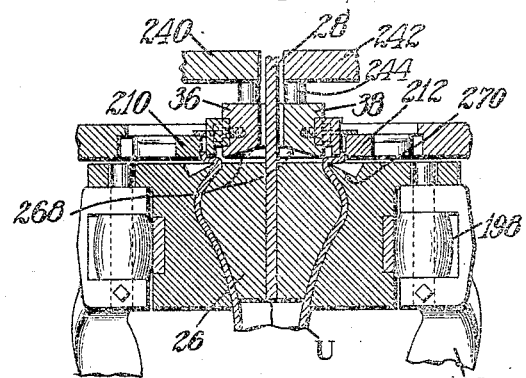
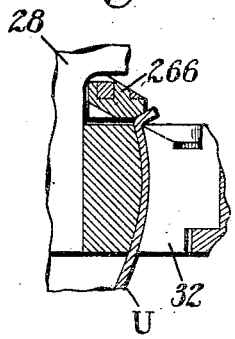
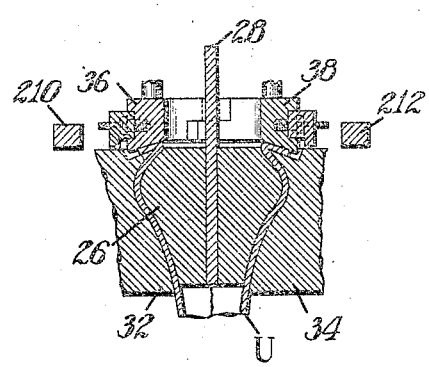

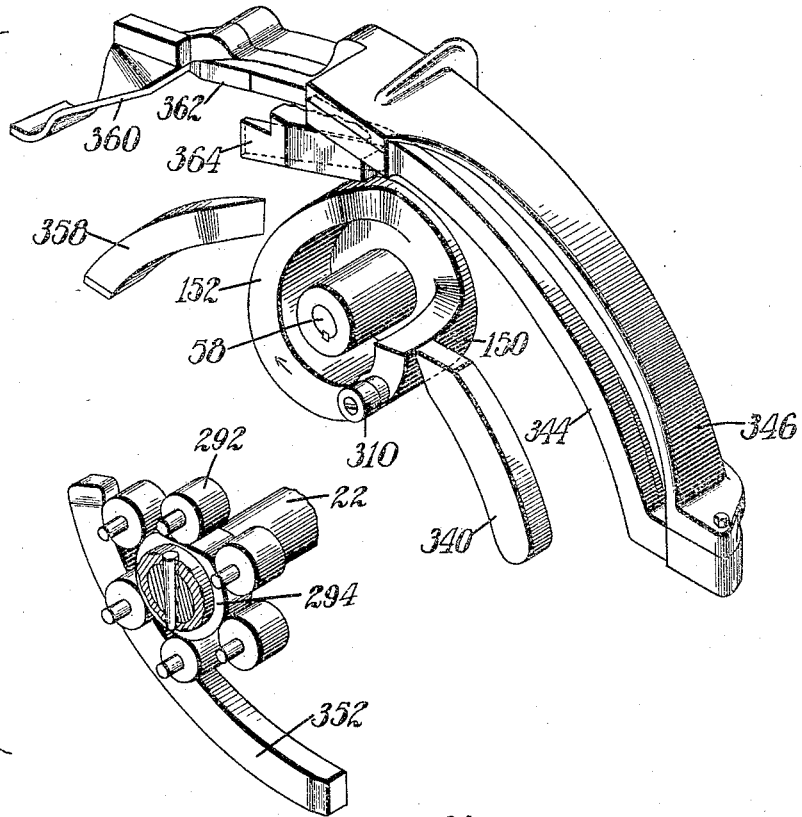
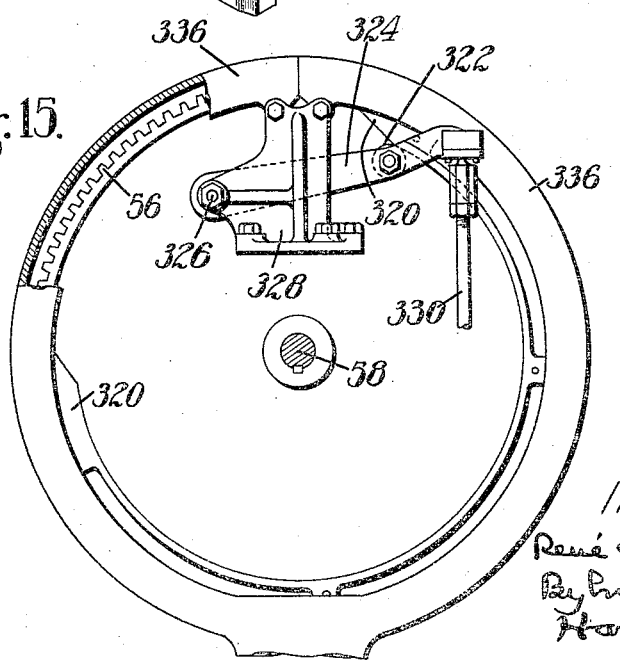

1,891,259

UNITED STATES PATENT OFFICE

RENÉ E. DUPLESSIS, OF BEVERLY, MASSACHUSETTS, ASSIGNOR TO UNITED SHOE MACHINERY CORPORATION, OF PATERSON, NEW JERSEY, A CORPORATION OF NEW JERSEY

MACHINE FOR SHAPING SHOE PARTS

Application filed January 4, 1930. Serial No. 418,632.

This invention relates to machines for shaping shoe parts and is illustrated as embodied in a machine for shaping the rear portions of the shoe uppers, the illustrated machine being designed especially for shaping uppers for stitchdown shoes having outturned flanges.

Heretofore machines for this work have usually been duplex; that is, two upper shaping mechanisms were provided which were used in alternation, an upper being left in one mechanism while another was being operated on in the other, such a machine being disclosed in my prior Letters Patent of the United States No. 1,706,277, granted March 19, 1929.

Objects of this invention are to provide a machine which, while retaining all the advantages of prior machines including that disclosed in my prior patent above mentioned, will enable the operator to remain in one working position, to provide a machine which, while being operated to full capacity, will enable the uppers to remain under shaping pressure long enough to effect adequate permanent setting thereof, and to provide a machine in which the duplication of parts for operating the upper shaping mechanisms will be minimized and floor space saved.

To this end and in accordance with a feature of the invention, the illustrated machine is provided with a movable carrier having thereon a plurality of sets of upper shaping mechanisms which are brought by movement of the carrier successively into a work receiving position, and means, preferably power operated, for actuating one of the shaping mechanisms while in that position. In the illustrated machine, additional means is provided for maintaining the shaping mechanism in shaping position when it is moved by the carrier out of work receiving position. Preferably, and as illustrated, the carrier consists of a turret mounted for intermittent rotation in a vertical plane about a fixed horizontal shaft and the shaping mechanisms are mounted in the peripheral portion of the turret. Each of the illustrated shaping mechanisms comprises an inside form or mold having the shape it is desired to impart to the rear portion of a shoe upper. This form is supported in a novel manner by a transversely thin plate fixed to the turret and extending forwardly and then radially of the turret, the plate entering the tread face of the former and being fixed thereto. This construction, without interfering with other parts of the machine, gives free access to the form so that an upper may be placed about it simply by moving the upper heightwise of the form toward its tread face. In the illustrated machine, this movement is radially of the turret or upward with respect to the form which is brought by rotation of the turret into an upper central position with respect to the machine, which is the work receiving position.

For shaping the body portion of the upper to the end and sides of the form, the illustrated machine is provided with mold members arranged for forward movement parallel to the axis of the turret or perpendicular to its plane of rotation to embrace the form and to shape the upper to the rear end of the form and for closing movement relatively to the form to shape the upper to the sides of the form. The forward movement of the mold members is effected by novel means during a dwell of the turret. For this purpose a rotary cam on the main shaft of the illustrated machine acts on a slide which, through heavy springs, imparts forward movement to the mold members. The rotary cam, while operating to move the mold slide forwardly, tends to rotate the turret and, accordingly, indexing means is provided for holding the turret positively in fixed position during operation of the cam to move the mold slide, the indexing means being automatically withdrawn after the cam has completed its action to permit rotation of the turret. The roll on the mold operating cam then engages one of a plurality of radial slots in the turret and acts to rotate the turret to bring another set of upper shaping mechanisms into upper receiving position. By this construction a single rotary means is utilized to operate the upper shaping means while the turret is at rest and then to effect rotation of the turret.

In order to effect the required pressure of the molds against the sides of the form, novel mold closing means is provided which applies pressure to opposite sides of the molds in the plane of rotation of the turret. For this purpose levers are pivoted to the mold slide and engage the sides of the molds at their forward ends, the rear ends of the levers lying in the path of adjustable means carried by the turret by which they are separated to cause their forward ends to close the molds. The adjustable means is so constructed that the pressure on the two mold members is equalized and is applied yieldingly, and, moreover, by adjustment of said means the timing of the application of the closing pressure to the molds may be varied relatively to the movement of the mold slide.

Associated with each set of molds for shaping the body portion of the upper there is, in the illustrated machine, means for further shaping the upper which acts to dispose a marginal portion of the upper extending beyond the molds in angular relation to the body portion. As illustrated herein, this means forms the marginal portion of the upper into an outturned flange and comprises flange formers or wipers pivoted together at their ends and normally located in a closed position over the tread face of the form.

As a novel feature of this organization the wipers are utilized as gripper members which engage the inside of the upper or lining adjacent to the wings of the counter. Gripper jaws cooperate with said members to hold the upper during the initial portion of the shaping action of the molds to prevent displacement of the upper and counter wings until the shaping action has progressed far enough to insure that the upper will be held in place by the mold closing pressure and then the jaws are released. The movement of the jaws to grip the upper for a time and then release it is effected, as illustrated, by continuous forward movement of the mold operating slide. Under some conditions gripper members may be attached to the wipers.

The flange forming members or wipers are initially, as illustrated, in novel relation to the form, the rear end of the wipers or a projection thereof at the rear of their pivot being in line radially of the turret with the apex of the rearward curvature or projection of the form, so that the margin of a straight counter and upper placed about the form with its margin projecting above the form will engage the rear end of the wipers and, as the molds close to shape the upper and counter to the form, the margin of the upper will be restrained from responding to the pressure of the molds inwardly of the form and will be caused to extend outwardly and rearwardly of the form, the formation of an outturned flange at the rear end of the upper being thus initiated and the upper being formed in at the bending line of the flange without the formation of wrinkles. In the novel organization illustrated the flange formers or wipers are operated to complete the formation of the flange during the first movement of the turret from the position where an upper is introduced into the machine, this operation being greatly facilitated by the fact that the formation of the flange at the rear end of the upper, where its formation presents the greatest difficulty, has already been initiated. In the illustrated machine, the wipers are given an opening and rearward movement to form the flange at the sides and to complete its formation at the rear end by a slide which is moved rearwardly by engagement of a roll on the slide with a fixed cam when the turret rotates.

In the illustrated machine the wipers are pressed toward the mold members during their flange forming movement to press and iron the flange against the mold members by a novel arrangement comprising a fixed cam on the turret shaft which operates a plunger radially of the turret to force the wipers toward the molds during the movement of the turret. Also, as illustrated, a novel organization is provided by which the plunger serves to lock the mold slide in mold closing position when the plunger is moved radially to apply pressure to the wipers.

These and other features of the invention, including various other novel constructions and arrangements of parts, will be more fully understood from the following detailed description when read in connection with the accompanying drawings and will be pointed out in the appended claims.

In the drawings,

Fig. 7 is a rear elevation, partly in section, of the stopping and starting mechanism;

Figs. 8, 9 and 10 are transverse sectional views taken through the upper shaping mechanism, the upper being conventionally shown and the views representing successive stages of the upper shaping operation;

Figs. 11, 12 and 13 are longitudinal sectional views of the shaping mechanism showing progressively the initiation and completion of the formation of the flange at the rear end of the shoe;

Fig. 14 is a fragmentary perspective view showing the various cams by which the upper shaping mechanisms are operated; and Fig. 15 is a front elevation, partly in section, of the mechanism for operating the indexing pin.

Figure 1:
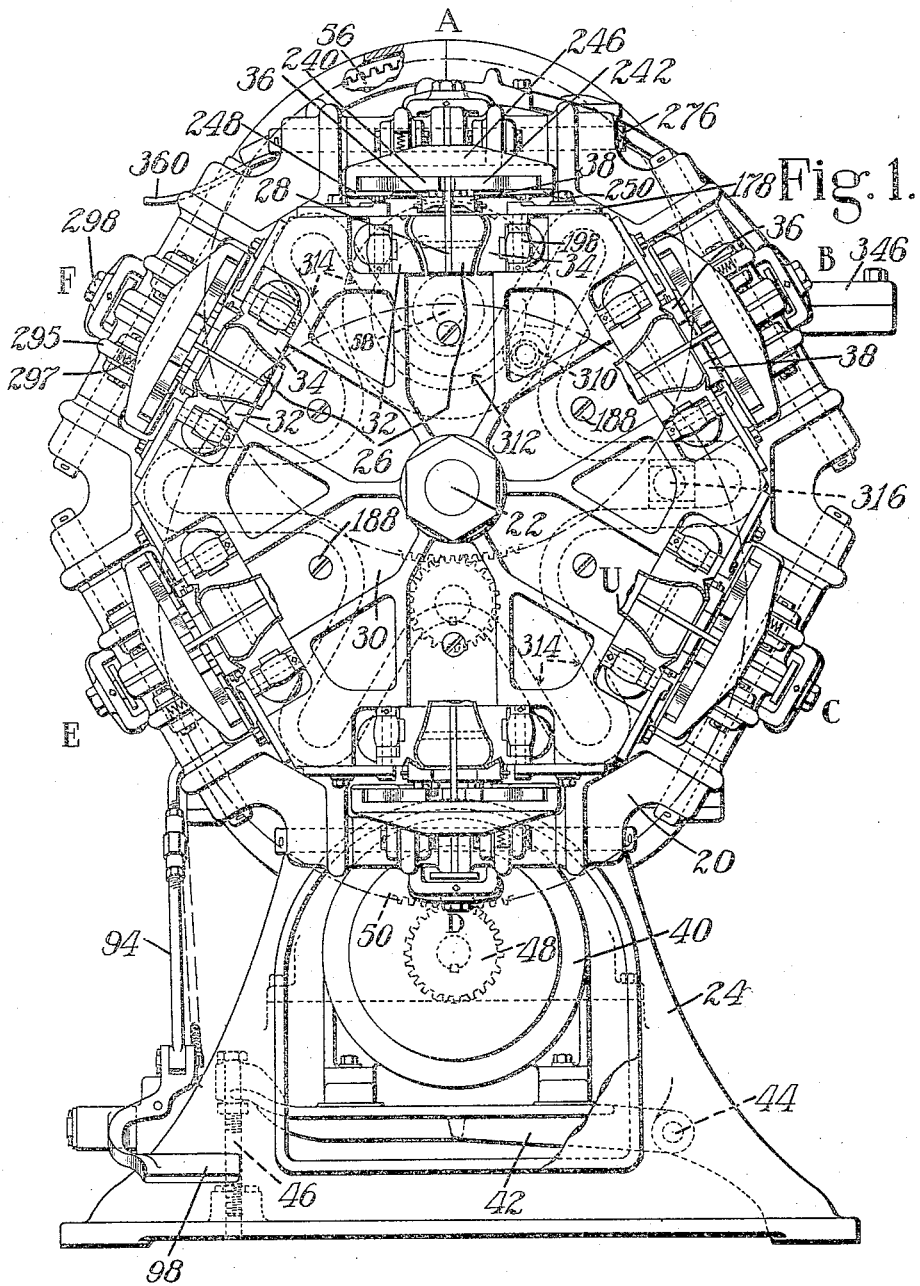
Fig. 1 is a front elevation of a machine embodying the present invention.
Figure 2:
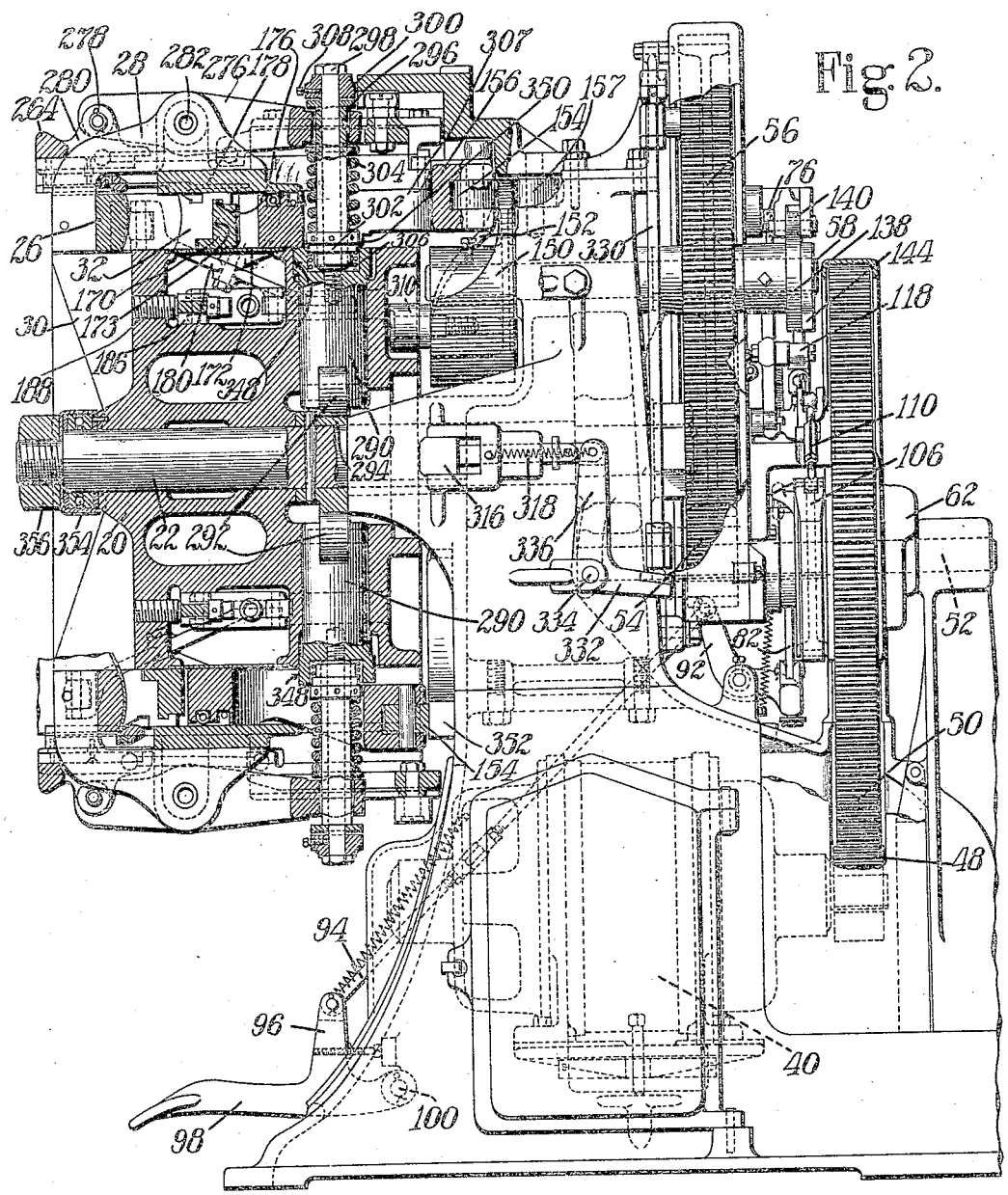
Fig. 2 is a side elevation, partly in section, of the machine shown in Fig. 1.

The illustrated machine for shaping the rear portion of a stitchdown shoe upper, including a counter or a counter and lining, to the shape of a last-shaped form and forming on the margin of the upper an outturned flange, comprises, as shown in Figs. 1 and 2, a carrier or turret 20 mounted for rotation in a vertical plane about a horizontal axis 22 which is a shaft fixed in a frame 24. Arranged about the periphery of the carrier 20 is a plurality of sets of upper shaping mechanisms the number of sets as illustrated being six. By rotation of the carrier the sets of upper shaping mechanisms are brought successively into an upper position indicated at A where the shaping mechanism is open and the upper is introduced. Each shaping mechanism includes an inner form or mold 26 shaped like the rear portion of a last and supported in a fixed position with respect to the carrier 20 by a member 28 which extends forwardly and downwardly to the tread face of the form when the form is in position A and enables the shoe upper to be readily positioned around the form by an upward movement, the turret or carrier 20 being provided with a recess 30 giving access to the form 26. Shaping members or molds 32, 34 are arranged for forward and closing movement relatively to the form 26 to shape the upper to the form and are operated while they are in position A in a manner to be described. Supplemental shaping means comprising flange members or wipers 36, 38 are provided for forming the margin of the upper which projects upwardly beyond the members 32, 34 into an outwardly directed flange and for pressing the flange against surfaces formed on the mold members 32, 34.

The general organization and functions of the machine having been thus briefly indicated, the manner in which power is applied to control and to operate the above-mentioned instrumentalities will now be explained and detailed description of the parts given. A motor 40 (Fig. 1) is bolted to a plate 42 which is pivoted at one side to the frame 24 at 44 and has at its opposite side an adjusting bolt 46 by which the meshing of a pinion 48 on the motor shaft with a gear 50 (Fig. 2) may be adjusted. The gear 50 is loose on a shaft 52 mounted in bearings on the frame 24. A pinion 54 is keyed to the shaft 52 and meshes with a gear 56 fixed on a shaft 58 which is suitably journaled in the frame and constitutes the main operating shaft of the machine. A driven clutch element 60 (Fig. 7) is keyed to the shaft 52 and a driving clutch element 62 of the clutch is formed in the hub of the gear 50. Forming part of the driven element is an expanding ring 64 which is operated to clutch elements 60 and 62 together substantially as disclosed in United States Letters Patent No. 1,011,903, granted December 19, 1911, on application of Arthur Bates. As explained more fully in said patent, the ring 64 is expanded by release of a spring-pressed plunger 66 which swings an arm 68 to expand the ring against the driving element 62 and set the clutch. The plunger is retracted and normally so held by a wedge 70 which engages a projection on the plunger 66. The wedge 70 is formed on one end of a lever 72 fulcrumed at 74 on the frame and is urged into clutch disengaging position by a spring 75. The lever 72 is connected by an adjustable link 76 with a lever 78 fulcrumed at 80 on the frame. The lever 78 is operated by a bar 82 the lower end of which is pivoted at 84 to ears formed on a pin 86. The pin 86 extends through a bell-mouthed hole in the end of one arm 88 of an angle lever fulcrumed at 90 on the frame and having its other arm 92 connected by an adjustable link 94 with an upwardly extending arm 96 (Fig. 2) of a treadle lever 98 fulcrumed at 100 to the frame. It will be seen that depression of the treadle causes the bar 82 to be lifted. A ledge 102 on the bar 82 engages a plate 104 on the lever 78, causing that to be lifted by the bar and hence the clutch to be set. By the same movement of the bar 82 a brake is released. The brake mechanism comprises a band 106 surrounding the driven member 60 and having one end fixed at 108. The other end of the band is attached by an adjustable link 110 to an arm 112 having a fixed fulcrum at 114. The arm 112 has an upward projection 116 which is engaged by a latch 118 pivoted at 120 to a lever 122 also fulcrumed at 114 and having on its upper end a roll 124 arranged to be engaged by a cam 126 on the main shaft 58. In Fig. 7 the brake is shown in set position, the machine being stopped. The latch 118 is urged toward the projection 116 by a spring 128 connected between the latch and the arm 112 and has its free end in the path of a plate 130 adjustably fixed to the bar 82. Upward movement of the bar as described therefore causes the plate 130 to lift the latch 118 and release the brake. Movement of the arm 112 is limited by a screw 132 threaded through the arm and engaging a stationary portion 134 of the frame. The lever 122, when released by the cam 126, is swung toward the shaft by a spring 136 connected between the pivot 120 and the frame, and the latch 118 reengages the projection 116.

The shaft 52 makes a number of revolutions to one of the shaft 58 and hence, to relieve the operator from having to hold the treadle down, a cam 138 is provided on the shaft 58 which engages a roll 140 on the lever 78 and holds the wedge 70 raised until a single revolution of the shaft 58 has been nearly completed and then allows it to drop to lower the wedge 70 and throw out the clutch. The upper end of the bar 82 is guided between surfaces formed on the lever 78 for slight movement toward the right (Fig. 7) about its pivot 84 and is held toward the left by a spring 142. To prevent the operator from producing more than one revolution of the shaft 58 at a time by holding the treadle depressed too long, a cam 144 on the shaft 58 is arranged to engage a plate 146 secured to the bar 82, the cam acting to swing the bar to the right and release the ledge 102 from the plate 104, thus releasing the lever 78 to control by the cam 138.

Figure 4:
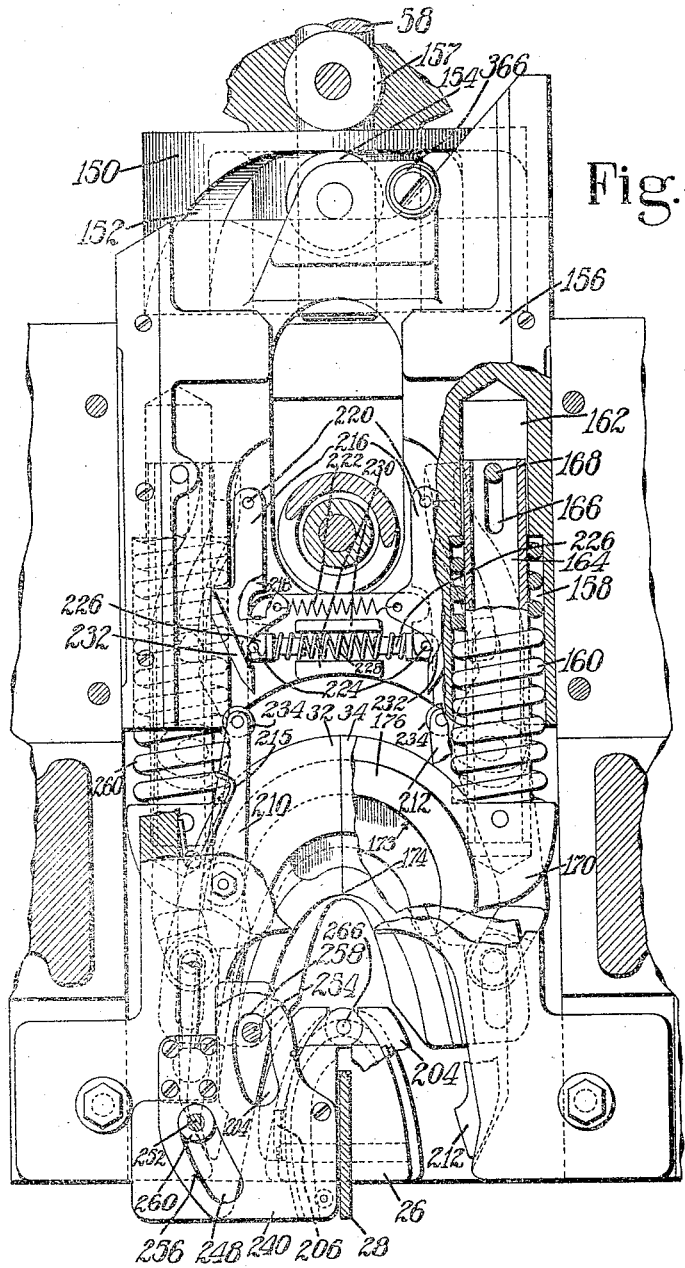
Fig. 4 is a view similar to Fig. 3, partly in section, the overlying parts being removed or broken away to show the mold advancing and closing mechanism and also the gripper operating mechanism.

Fixed on the forward end of the main shaft 58 and behind the carrier or turret 20 is a cam member 150 (Fig. 2) which has a cam face 152 engaging a roll 154 on the rear end of a slide 156 mounted in the turret 20 for horizontal movement. The rearward thrust of the cam member 150 is taken by a roll 157 mounted on the frame and engaging the rear face of the cam member which is perpendicular to the shaft 58. The slide 156 (Fig. 4) is bored longitudinally on each side at 158 to receive a heavy spring 160 and is counterbored at 162 to receive a sleeve 164, the rear end of which is slotted at 166 to receive a pin 168 which passes through the slot 166 and is seated in the slide 156. This pin-and-slot connection limits forward movement of the sleeves relatively to the slide and permits rearward movement of the sleeves relatively to the slide. The sleeves 164 at their forward ends are each pinned to a member 170 arranged for sliding movement in the same direction as the slide 156 and supported (Fig. 2) by a plate 172 arranged between portions of the turret 20. Forward movement of the slide 156 acts through the springs 160 to move the member 170 forward and on this member the mold members 32, 34 are mounted for closing movement. The member 170 is formed on its front face with a large cylindrical curved surface 173 against which similar surfaces on the mold members abut, the center of curvature of the surfaces being located at 174 where the shoe upper engaging surfaces of the molds join and substantially where the mold surfaces engage the back seam of the upper. The member 170 has on its upper face a rib 176 concentric with the center 174 which engages corresponding grooves formed in portions of the mold members which overhang the member 170. A cap plate 178 holds the molds down so that they are, by the construction described, connected to the member 170 for forward and rearward movement therewith but can freely close and open about the center 174.

Figure 5:
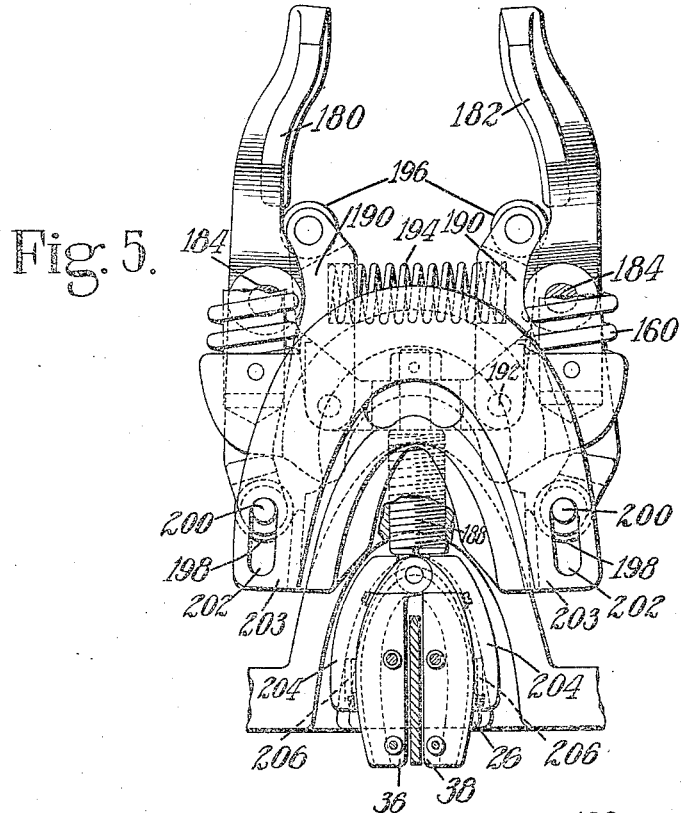
Fig. 5 is a plan view of the mechanism for applying side pressure to the mold members, the mold members being in retracted position.

For closing the mold members 32, 34, levers 180, 182 (Fig. 5) are each pivoted at 184 to the slide 156 and extend downwardly and rearwardly at about thirty degrees to the horizontal (Fig. 2), the pivots being at right angles to this direction. The lower ends of the levers 180, 182, when moved forward by the slide 156, engage lever operating mechanism best shown in Figs. 2, 5 and 6. A block 186 rests on a flat surface formed on the turret 20 and a screw 188 is threaded through a portion of the turret and has its inner end reduced and passed through the block where it is secured rotatably but against endwise movement in the block. Each lateral end of the block 186 is reduced to receive the bifurcated end of an arm 190 which is pivoted at 192 to the block, a face 193 on the block being arranged to engage a corresponding face on the arm to limit its outward swinging movement. A strong compression spring 194 has its ends received in recesses in the arms 190 and the rear ends of the arms are provided with rolls 196 which the inturned rear ends of the levers 180, 182 engage. The forward ends of the levers 180, 182 are provided with rolls 198 (made somewhat barrel shaped because of the angular position of the lever pivots) which engage flat surfaces formed respectively on the mold members 32, 34. Pins 200 forming the axes of the rolls 198 extend up through slots 202 formed in outwardly extending flanges 203 of the mold members. When the slide 156 moves rearwardly, the pins 200 reach the rear ends of the slots 202 and the molds are opened. The opening and closing movements about the center 174, are slight, being as shown, only five degrees for each mold or ten degrees in all. This avoids, when the mold members close, any substantial opening of the vertical joint between the molds which curves longitudinally of the molds to correspond to the curve desired at the back seam, the center 174 lying in the upper end of the joint. It will be seen that as the slide 156 moves forward carrying the levers 180, 182 with it, the inturned ends of the levers engage the rolls 196, causing the levers to separate under pressure determined by the spring 194, the forward ends of the levers being moved toward each other to apply pressure to the mold members 32, 34 to cause the upper to be shaped to the form 26. By adjusting the screw 188, which is accessible at the front of the turret, the rolls 196 may be moved forwardly and rearwardly to vary the time during the movement of the slide 156 when the mold members will be closed.

The rear portion of a shoe upper, shown for convenience in the drawings as a single layer but usually including a straight counter or a counter and lining, is placed about the form 26 with its margin projecting above the form to provide material for forming an outturned flange, the width of the projecting marginal portion being determined by gages 204, 204 (Fig. 4) secured for vertical adjustment to the flange formers 36, 38. When the molds 32, 34 are operated, pressure is applied first at the rear end of the form to shape the upper in the region of the back seam to the shape of the form. This pressure tends usually to displace the wings of the counter vertically from the position in which they were placed by the operator, and accordingly it is desirable to provide means for holding the wings of the counter in position during the action of the molds until they have so clamped the upper to the form that there is no longer any danger that it will be displaced. As illustrated, means is provided for gripping the upwardly extending margin of the upper materials, including the wings of the counter, during the earlier portion of the mold movements.

One part 206 of the gripping means is formed on or attached to each of the two flange forming members 36, 38, above referred to, which, during the closing of the molds, are located over the top face of the form 26. The gripper members or parts 206, 206 engage the lining, if present, and are preferably roughened. A gripper lever 210 (Fig. 6) coöperates with the gripper part 206 at one side of the form and a similar lever 212 with the part 204 at the other side. The levers 210, 212 are pivoted between their ends at 214 to the cap plate 178 and hence have no movement longitudinally of the form. The rear ends of the levers are normally urged toward each other by springs 215 and are separated to cause their front ends to grip the upper and the wings of the counter against the parts 206 by means best shown in Figs. 4 and 6.

Figure 6:
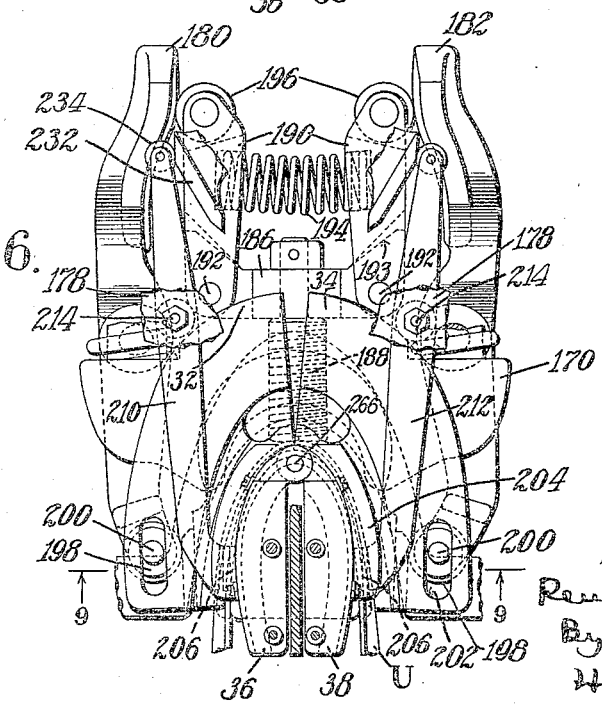
Fig. 6 is a similar view showing the mold members in advanced and closed position and showing also the upper grippers in operative position.

At one side of the slide 156 nearly in longitudinal alinement with the gripper lever 210, is a pair of superposed links 216, 218 pivoted to the slide 156 at 220. At the opposite side of the slide is a pair of similar links similarly indicated for the lever 212. The upper links 216 are held toward each other by a light spring 222 and have their inward movement limited by pins 224 projecting upwardly from the forward ends of the links 218. Studs 226 are pivoted by the pins 224 to the links 218 and engage in opposite ends of a stiff compression spring 228 which is held from buckling when compressed by flanges 230 extending upwardly from the slide 156. On the forward ends of the upper links 216 are inclined flanges 232 having pointed ends. When the slide moves forward the inclined flanges 232 engage rolls 234 mounted on the lower faces of the ends of the levers 210, 212 and move them apart, causing the front ends of the levers to grip the upper and counter with a force determined by the spring 228, as shown in Fig. 6. When movement of the slide has progressed far enough to cause the molds 32, 34 to assume control of the upper, the inclined flanges 232 have moved forwardly beyond the rolls 234, thus permitting the grippers to release the upper. When the slide 156 is retracted, the rolls 234 engage the inner faces of the flanges 232 and swing the upper links 216 outwardly against the tension of the spring 222 which, when the flanges 232 have passed rearwardly of the rolls, moves the links 216 toward each other again so that upon the next forward movement of the slide the outer faces of the flanges 232 will engage the rolls 234.

Figure 3:
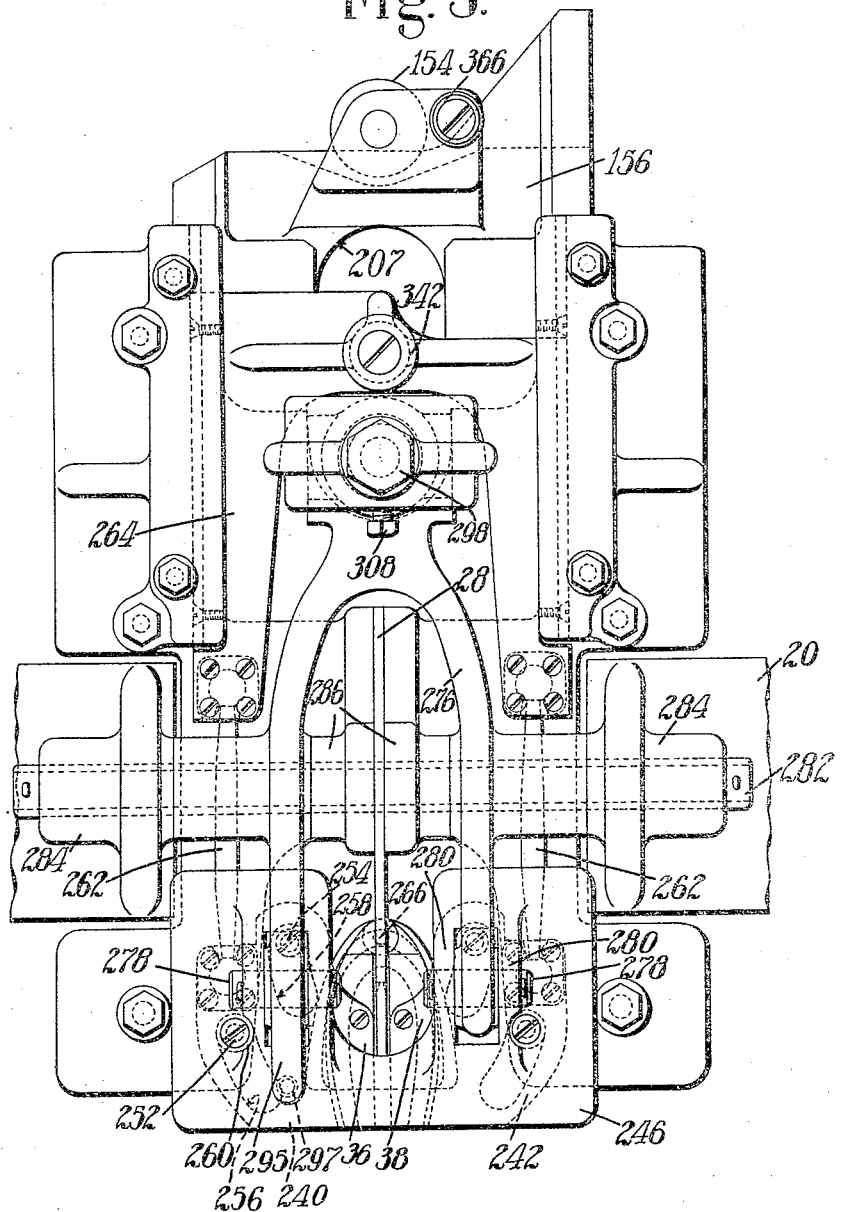
Fig. 3 is a plan view of one of the upper shaping mechanisms.

The flange forming members or wipers 36, 38, referred to above as each carrying one jaw 206 of the grippers, are mounted on the under side of wiper carriers 240, 242 (Figs. 3 and 4) by means of screws and spacing sleeves 244, as best shown in Fig. 9. The carriers 240, 242 are each mounted between a common top plate 246 and one of two smaller lower plates 248, 250 (Fig. 1). The lower plate 248 is supported from the top plate 246 by bolts 252, 254 which pass through slots 256, 258 in the carrier 240. The bolt 252 carries a roll 260 fitting the slot 256 which is shaped to give the desired opening and rearward movements to the carrier, but the bolt 254 in the slot 258 has no roll so that movement of the carrier is not restricted by the bolt 254. The mounting of the opposite carrier 242 is similar. Each of the carriers is connected by a ball-jointed link 262 to a slide 264 mounted for forward and rearward sliding movement on the top plate 178. The wipers 36, 38 are hinged together at 266 so that rearward movement of the slide 264 causes the wipers to separate about the pivot 266 and to move rearwardly to effect the flange forming operation, their movement being controlled by the slots 256. Means for actuating the slide 264 will be later described.

As best shown in Figs. 8 to 10, the flange forming wipers 36, 38 are formed on their lower faces with surfaces 268 downwardly and outwardly directed with respect to the form 26, and the mold members 32, 34 are formed on their upper and inner marginal portions with similar surfaces 270 which, however, are not quite parallel to the surfaces 268, the surfaces diverging outwardly so that when the flange formers 36, 38 move downwardly, maximum pressure is applied to the flange adjacent to the fold or angle made in the upper materials between the body portion of the upper and the flange. It will be observed (Figs. 2 and 11) that the pivot 266 of the wipers is located at the rear edge of their forming surfaces 270 and that the wipers have a rearward projection 272 the rear end of which, when the wipers are in their normal or initial position, is in substantially vertical alinement with the point of greatest rearward projection of the longitudinal curve of the rear end of the form 26. The molds 32, 34 are formed with a recess 274 to receive the projecting rear end of the wipers when they are in operative position. When an upper having a straight counter is placed in the machine, its upper marginal portion will rest against the rearward projection 272 of the wipers and as the molds 32, 34 close and shape the upper to the curved rear end of the form, the formation of a flange at the rear end will be initiated by the resistance of the projection 272 (Figs. 11 and 12) of the wipers. This is of importance because the most difficult part of the flange forming operation is at the rear end and the action of the molds in forming in the upper at the flange line while the flange portion is held from responding to their movement results in uniform formation of the flange at the rear end without wrinkles. The subsequent rearward and separating movements of the wipers readily take care of the formation of the flange at the sides and the completion of the formation at the rear end.

During their spreading action the wipers are moved heightwise toward the form to iron and press the flange. The plate 246 (Fig. 3) is pivoted to a U-shaped lever 276, each branch of the lever being pivoted by a pin 278 to a pair of upstanding ears 280 on the plate 264. The fulcrum of the lever 276 is formed by a pin 282 which passes through two upstanding ears 284 on the turret 20, through two sleeves formed on the branches of the lever 276, through two upstanding ears 286 on the top plate 178, and through the support 28 of the form 26, all of these parts being thus fixed against outward movement relatively to the turret 20. It will be noted (Fig. 2) that the form support 28 has its lower edge bottoming on the top plate 178 so that it is maintained in fixed relation to the turret by the pin 282. The rear end of the lever 276 is connected by yielding means to an operating plunger 290 (Fig. 2) having on its lower end a roll 292 which engages a cam 294 fixed on the shaft 22. Rotation of the turret therefore causes the plunger to be operated by the cam. The plate 246, on the lower face of which the wipers 36, 38 are mounted, can tip on the pins 278. In order to maintain the plate in a position substantially parallel to the tread face of the form 26 and to assist the wipers in resisting the forward thrust of the margin of the upper while the molds are initiating the formation of the flange at the rear end of the upper, one of the arms of the U-shaped lever 276 (Fig. 3) is provided with a projection 295 between which and the plate 246 is a spring 297.

In the upper part of Fig. 2 one of the plungers 290 is in its position nearest the shaft 22 and in the lower part of the figure another plunger is in its extreme outward position relatively to the shaft. Passing loosely through the rear end of the lever 276 is a sleeve 296, and a bolt 298 passes through a cap 300 and washer bearing on the lever, through the sleeve 296, and is threaded into the plunger 290. Between a collar 302 threaded on the sleeve 296 and a washer bearing on the lower face of the lever 276 is a strong spring 304. In a recess in the top of the plunger 290 is a light spring 306 bearing on the lower face of the collar 302 and acting normally to hold the sleeve 296 raised slightly from the bottom of the recess. The slide 156 is slotted at 307 to permit passage of the spring 304 through it without interfering with its forward and rearward movements.

This construction enables the spring 304 to be maintained under initial tension which may be varied by adjusting the collar 302 which is provided with capstan holes and also enables the initial position of the lever 276 to be adjusted by turning of the bolt 298 which is maintained against accidental turning by a set-screw 308 in the cap 300, which, to prevent its turning, is provided with downturned lugs engaging the lever 276.

Movement of the plunger 290 outwardly of the turret by its cam 294 first acts through the light spring 306 to move the plate 264 downwardly and cause the wipers 36, 38 to be pressed toward the form 26 and mold members 32, 34 with light pressure during the initial part of their separating movement so as to avoid their injuring the upper. As soon as the formation of the flange has been initiated, the yield of the light spring 306 is taken up and the sleeve 296 engages the plunger so that thereafter movement of the plunger causes progressively greater pressure to be applied to the wipers through the strong spring 304, the wipers at the same time being opened and moved rearwardly to iron out the flange.

The described flange forming operation occurs during the first sixty degrees of rotation of the turret 20 to the right (Fig. 1), which is effected by modified Geneva stop mechanism. The cam 150 on the main shaft 58 carries a roll 310 which, during the first 120 degrees of rotation from its starting position there shown, will simply engage a locking surface 312 on the turret, which surface is concentric with the shaft 58 so that no movement is imparted to the turret. It is during this part of the rotation of the cam 150 that the mold members 32, 34 and the grippers 210, 212 are operated to effect shaping of the upper to the form 26. The roll 310 then engages a radial slot 314 formed in the rear face of the turret and causes it to be rotated sixty degrees during the remainder of the single rotation of the shaft 58. There is, of course, a like radial slot 314 for each of the similar sets of upper shaping mechanisms, and the turret is intermittently rotated sixty degrees at a time to bring each of said mechanisms successively into the positions indicated (Fig. 1) by A, B, C, D, E and F.

In the construction described it will be seen that the action of the cam face 152 upon the roll 154 of the slide 156 tends to rotate the turret clockwise (Fig. 1), thus causing the roll 310 on the cam 150 to bind against the surface 312. To prevent this and to hold the turret more positively in position while at rest, an indexing pin 316 (Fig. 2) is provided. The pin 316 is guided in the frame 24 in position to engage that one of the radial slots 314 which is horizontal and at the right of the machine (Fig. 1). The pin 316 is urged toward the turret by a spring 318 and is allowed to enter one of the slots 314 when the machine starts and to remain therein until that part of the rotation of the shaft 58 is reached during which the turret is rotated, and is then withdrawn. For this purpose there is mounted on the gear 56 a cam 320 (Fig. 15) which engages a roll 322 mounted on a lever 324 between its ends. One end of the lever is fulcrumed at 326 on a bracket at 328 secured to the frame and the other end of the lever is connected by a rod 330 to one arm 332 (Fig. 2) of a bell-crank lever fulcrumed at 334 to the frame and having its other arm 336 linked to the pin 316. Preferably the corners of the pin are slightly rounded to insure its being forced into the slot by the spring 318. From Fig. 15 it will be seen that the pin will remain in to prevent rotation of the turret for about the first ninety degrees of rotation of the gear 56 and will then be withdrawn to permit rotation of the turret. Gear guards 336 are supported on the bracket 328.

As best shown in Fig. 14, various fixed cams operate during rotation of the turret upon the upper shaping mechanism described. When the cam 150 has moved the slide 156 far enough to close the mold and apply nearly all the closing pressure, the index pin 316 is released and the roll 310 begins to rotate the turret 20. Movement of the turret brings the roll 154 of the slide 156, while still held forward by the cam 150, in a position to engage a fixed cam 340 which maintains the molds in closed position and imparts slight further movement to the slide. When the turret started from position A, moreover, a roll 342 on the wiper operating slide 264 was positioned behind a curved cam bar 344 (Fig. 14) supported by a bracket 346 secured to the machine frame. The rear face of the cam bar 344 is shaped to cause the slide 264 to be drawn rearwardly as the turret is rotated and to be completely withdrawn after about sixty degrees rotation of the turret, the wipers being thus operated to turn the marginal portion of the upper outwardly. During this part of the rotation of the turret the cam 294 was acting on the roll 292 of the plunger 290 to apply pressure to the wipers inwardly of the turret. The plunger is formed with surfaces 348 which, when the plunger is thus raised, pass behind surfaces 350 (Fig. 2) formed on the lower face of the slide 156 which at this time is being held by the fixed cam 340 in its extreme forward position. When, during the next partial rotation of the turret, the roll 154 of the slide 156 passes beyond the cam 340, the plunger 290 serves to lock the molds positively in closed position, as shown in the lower part of Fig. 2, so as to remain until they pass from position F to position A.

It will be seen that during the operation of the cam 150 upon the slide 156 in position A, considerable side thrust is applied to the shaft 22. To offset this side thrust and also that of the cam 340, a curved cam bar 352 about sixty degrees in extent is provided adjacent to position D to engage the roll 154 of the slide 156 which is then in that position and thus apply outward pressure to the slide 156 which is at that side of the turret which is diametrically opposite the position A at D and during its passage from D to E. Outward thrust of the turret thus occasioned is taken by a ball-thrust-bearing 354 held on the shaft 22 by a nut 356. When one of the mold mechanisms is passing from position F to position A the roll 154 of the slide 156 engages a curved cam bar 358 which presses forward on the slide to release the plunger 290 from the pressure of the mold closing springs 160 so that a stationary cam 360 which engages the head of the bolt 298 will push the plunger 290 inwardly, the support of the plunger by the cam 294 having, of course, been released at this time. During this part of the movement of the turret a fixed cam 362 engages the roll 342 on the wiper operating slide 264 and pushes it forwardly to return the wipers to their normal closed position. To insure complete return of the slide 156 to its rearward position as its roll 154 passes off the cam 358, a cam 364 is provided the rear face of which is engaged by a roll 366 mounted on the upper face of the slide 156, the rear face of this cam being so inclined to the direction of movement of the turret and of such length that the slide will be fully withdrawn and the roll 366 will have passed beyond the end of the cam 364 when it reaches position A.

In the operation of the machine, an upper U, which usually includes a straight counter fastened to the upper or located between the upper and the lining, is presented by an upward movement about the form 26 which is in position A, the molds 32, 34 at this station being open and retracted and the flange formers or wipers 36, 38 being closed over the tread face of the form. The width of the marginal portion of the upper which projects above the molds 32, 34 is determined by the gages 204. After thus locating the upper heightwise of the form 26, the operator draws it forwardly against the form so that the upper at the rear end of the form extends in a straight line from the rearward projection 272 of the wipers to the apex of the longitudinal curvature of the form.

The operator now depresses the treadle 98 to trip the clutch and cause a single rotation of the gear 56. The cam 320 on the gear immediately releases the roll 322 (Fig. 15) on the lever 324 and allows the spring 318 to introduce the indexing pin 316 into one of the radial slots 314 of the turret to prevent its rotation. As the cam 150 driven by the gear 56 revolves, its surface 152 pushes forwardly on the roll 154 of the mold slide 156, causing the molds 32, 34 to press the upper against the rear end of the form through the spring 160. During this movement the levers 210, 212 are operated by the flanges 232 carried by the slide 156 to cause the lever jaws, under pressure of the spring 228, to grip the upper against the gripper members or surfaces 206 on the wipers to hold the wings of the counter in place. As shown in Figs. 11 and 12, the margin of the upper is restrained by the projecting rear end of the wipers from responding to the pressure of the molds as they shape the upper to the form. The upper is thus shaped in about the tread face of the form without the formation of wrinkles while the margin is turned outwardly relatively to the form and the formation of the flange at the rear end of the form is initiated. As the forward movement of the slide 156 continues, the levers 180, 182 carried thereby engage the rolls 196 and are separated under pressure of the spring 194 to cause the rolls 198 to press the molds 32, 34 against the sides of the form, completing the shaping of the body portion of the upper. During the final portion of the forward movement of the slide the flanges 232 pass beyond the rolls on the ends of the levers 210, 212, so that their grip on the margin of the upper is released.

The cam 320 on the gear 56 now operates the lever 324 to retract the indexing pin 316, and the roll 310 on the cam 150, having now reached the radial slot 314 at the left of station A, begins to rotate the turret clockwise. The roll of the mold slide 156 is carried by rotation of the turret from the rotary cam 150 on to the stationary cam 340, which preferably applies some further forward motion to the slide. As the turret turns, the roll 342 on the wiper slide 264 passes behind the fixed cam 344, which causes the slide to be drawn rearwardly and imparts opening and rearward movements to the wipers to complete the formation of the outturned flange. At the same time the plunger 290 is being operated by its fixed cam 294 to move the wipers downwardly, first, through the light spring 306 during the initial action of the wipers to turn the flange at the sides, and then through the heavy spring 304 to press and iron the flange.

Finally the upper end of the plunger 290 passes behind the surfaces 350 on the mold slide 156, locking the molds in closed position so to remain until this upper shaping mechanism is moved from station F to station A.

The operation is continued by placing uppers in successive shaping mechanisms until the sixth upper has been inserted. As the sixth mechanism to be filled is moved from station A to station B, the first one filled is moved from station F to station A. During this movement the roll 154 of the mold slide engages the fixed cam 358 (Fig. 14) which applies enough forward pressure to the slide to release the plunger 290 so that the spring 304 may react to push the plunger down and release the slide 156, the cam 294 being of course shaped to permit such movement of the plunger at this point. The head of the bolt 298 engages the fixed cam 260 to complete the depression of the plunger 290. The roll 342 on the wiper slide engages the fixed cam 262 on the wiper slide which is pushed forward to close the wipers over the tread face of the form and the roll 366 on the mold slide 156 engages behind the mold return cam 364 to retract and open the mold, and the machine stops with the first mechanism filled in its initial position ready for the upper to be removed and another upper inserted. The operator therefore can, while standing in one position, work to his full capacity to place successive uppers in the machine and the uppers will remain in molding position long enough to insure that the uppers will be permanently set in molded condition.

Having thus described my invention, what I claim as new and desire to secure by Letters Patent of the United States is:

1. In an upper shaping machine, the combination of a carrier, a plurality of sets of upper shaping mechanisms on the carrier, power-operated means for moving the carrier to present each of the sets in upper receiving position for introduction of an upper, and power means for operating in turn each set so presented to shape the upper while in said position.

2. In a machine for operating on shoe uppers, the combination of a rotary carrier, a plurality of sets of upper shaping members mounted on the carrier, a Geneva movement for imparting intermittent movement to the carrier, and a cam operating during a dwell of the carrier for operating the shaping members.

3. In an upper shaping machine, the combination of a carrier, a plurality of sets of upper shaping mechanisms mounted on the carrier, power-operated means for intermittently moving the carrier to present said mechanisms successively in work receiving position for introduction of an upper, and power-operated means for operating the mechanisms so presented to shape the upper while the carrier is at rest.

4. In a machine of the class described, a carrier, a plurality of sets of mold members mounted on the carrier, and a single means for operating each set of mold members when it is presented in one position by the carrier and for moving the carrier after the mold members of each set have been operated to present another set of mold members in operative relation to said single means.

5. In a machine for operating on shoe uppers, the combination of a rotary carrier, a plurality of sets of upper shaping members mounted on the carrier, power-operated means for imparting intermittent movement to the carrier to present said sets successively in upper receiving position, and means operating in timed relation to the dwell of the carrier for operating the set of upper shaping members which is in upper receiving position.

6. In a machine for shaping shoe uppers, the combination of a rotary carrier, a plurality of sets of upper shaping members mounted on the carrier, and rotary means for first operating one of the sets of shaping members while the carrier is at rest and then moving the carrier to present another set of shaping members in position to be operated upon by said rotary means.

7. In a machine for shaping shoe uppers, the combination of a rotary carrier, a plurality of sets of upper shaping members mounted on the carrier, movement of the carrier presenting said sets successively in upper receiving position, and rotary means for first operating the set of upper shaping members which is in upper receiving position while the carrier is at rest and then moving the carrier to present another set of shaping members in upper receiving position.

8. In an upper shaping machine, the combination of a turret, a plurality of sets of upper shaping mechanisms arranged about the periphery of the turret, and power-operated means for intermittently rotating the turret to present the shaping mechanisms successively in work receiving position for introduction of an upper and for operating each shaping mechanism to shape the upper.

9. In an upper shaping machine, the combination of a turret, a plurality of sets of upper shaping mechanisms arranged about the periphery of the turret, and power-operated means for operating the shaping mechanisms in turn and for imparting intermittent movements to the turret.

10. In an upper shaping machine, the combination of a turret, a plurality of sets of upper shaping mechanisms arranged about the periphery of the turret, and a single rotary means for operating the shaping mechanisms in turn and for imparting intermittent movements to the turret.

11. In an upper shaping machine, the combination of a turret, a plurality of upper shaping mechanisms arranged about the periphery of the turret, and power-operated means for intermittently rotating the turret to present the shaping mechanisms successively in work receiving position for introduction of an upper and for operating the shaping mechanisms in turn while each is in work receiving position.

12. In an upper shaping machine, the combination of a turret, a plurality of upper shaping mechanisms arranged about the periphery of the turret, power-operated means for intermittently rotating the turret to present the shaping mechanisms successively in work receiving position for introduction of an upper, and rotary means for operating the shaping mechanisms in turn while each is in work receiving position.

13. In a machine for shaping shoe uppers, the combination of a turret, a series of sets of upper shaping mechanisms mounted on the turret, each set comprising an inner form and an outer mold relatively movable lengthwise of the form, and means constructed and arranged for effecting relative lengthwise movement between the mold and the form to shape the upper about the form.

14. In a machine for shaping shoe uppers, the combination of a turret mounted for rotation on a horizontal axis, and a series of sets of upper shaping mechanisms mounted on the turret each comprising an inner form and an outer mold, the inner form of each set being fixed to the turret and the outer mold of that set being movable relatively to the form to shape the upper about the form.

15. In a machine for shaping shoe uppers, the combination of a turret, a series of sets of upper shaping mechanisms mounted on the turret, each set comprising an inner form fixed to the turret and an outer mold having two parts constructed and arranged for bodily movement relative to the form to press the upper against the rear end of the form and for relative closing movement to wrap the upper about the form, and means for operating the outer mold.

16. In an upper shaping machine, the combination of a turret, a plurality of sets of upper shaping mechanisms arranged about the periphery of the turret, power-operated means for intermittently rotating the turret to present the shaping mechanisms successively in work receiving position for introduction of an upper, and power-operated means for operating each shaping mechanism while the turret is at rest with a shaping mechanism in work receiving position.

17. In a machine for shaping shoe uppers, the combination of a turret, a series of sets of upper shaping mechanisms mounted on the turret, each set comprising an inner form fixed to the turret and a two-part outer mold, said mold being constructed and arranged for bodily movement and its parts for relative closing movement, means for moving the mold bodily to press the upper against the rear end of the form, and means for closing the mold parts against the form to shape the upper to the sides of the form.

18. In a machine for shaping shoe uppers, the combination of a turret mounted to rotate in a vertical plane, a series of sets of upper shaping mechanisms mounted on the turret, each set comprising an inner form fixed to the turret and a two-part outer mold constructed and arranged for bodily movement relatively to the form, means acting in a direction perpendicular to the plane of rotation of the turret for effecting bodily movement of the mold to press the upper against the rear end of the form, and means acting in the plane of rotation of the turret for effecting relative closing movement of the mold to wrap the upper about the form.

19. In a machine for shaping shoe uppers, the combination of a turret mounted to rotate in a vertical plane, a series of sets of upper shaping mechanisms mounted on the turret, each set comprising an inner form fixed to the turret and a two-part outer mold constructed and arranged for bodily movement relatively to the form, means acting in a direction perpendicular to the plane of rotation of the turret for effecting bodily movement of the mold to press the upper against the rear end of the form, means acting in the plane of rotation of the turret for effecting relative closing movement of the mold to wrap the upper about the form, and means for rotating the turret.

20. In a machine for shaping uppers, the combination of a turret mounted for rotation on a horizontal axis, and a series of sets of upper shaping mechanisms mounted on the turret, each comprising an inner form and an outer mold, the inner form being fixed to the turret and the outer mold being movable relatively to the form in a direction parallel to the axis of the turret to shape the upper about the form.

21. In a machine for shaping shoe uppers, the combination of a turret mounted for rotation on a horizontal axis, a series of sets of upper shaping mechanisms mounted on the turret, each comprising an inner form and an outer mold, and means independent of the turret for relatively moving the form and the outer mold to shape the upper to the form.

22. In a machine for shaping shoe uppers, the combination of a turret mounted for rotation on an axis, a series of sets of upper shaping mechanisms mounted on the turret, each comprising an inner form and an outer mold arranged with their longitudinal axes parallel to said axis, and means for relatively moving the form and the outer mold in a direction parallel to said axis to shape the upper about the form.

23. In a machine for shaping shoe uppers, the combination of a turret mounted for rotation on a horizontal axis and having radial slots, a series of sets of upper shaping members mounted on the periphery of the turret, a rotary cam, and a crank pin on the cam, the cam acting to operate the upper shaping members while the turret is at rest and the crank pin acting while in engagement with one of the radial slots to rotate the turret and present another one of said sets of shaping members in position to be operated by the cam.

24. In a machine for shaping shoe uppers, the combination of a turret mounted for rotation on a horizontal axis and having radial slots, a series of sets of upper shaping members mounted on the periphery of the turret and adapted to be brought by rotation of the turret into upper receiving position, a rotary cam, and a crank pin on the cam, the cam acting to operate that set of upper shaping members which is in upper receiving position while the turret is at rest and the crank pin acting by engagement with one of the radial slots to rotate the turret and present another set of said shaping members in upper receiving position there to be operated by said cam.

25. In a machine for shaping uppers, the combination of a turret, a series of sets of upper shaping mechanisms mounted on the turret, each set comprising an inner form having the shape it is desired to impart to the rear portion of a shoe upper and an outer mold for shaping the upper to the form, and means independent of the turret for effecting relative bodily movement between the mold and the form to shape the upper about the rear end of the form.

26. In an upper shaping machine, a turret, a plurality of sets of upper shaping devices mounted on the turret, each set including inner and outer mold members constructed and arranged for relative movement to shape an upper between them, means for rotating the turret step by step to present each set successively in upper receiving position, means for operating each set of mold members when brought into said position by a movement of the turret, and means acting automatically to hold the turret in fixed position during operation of the mold members and then releasing it.

27. In an upper shaping machine, the combination of a carrier, a plurality of sets of upper shaping mechanisms on the carrier, means for moving the carrier to present the sets successively in a work receiving position for introduction of an upper, means for operating each set so presented to shape the upper while in said position, and means operated by movement of the carrier for further shaping the upper.

28. In an upper shaping machine, the combination of a carrier, a plurality of sets of upper shaping mechanisms mounted on the carrier, power-operated means for intermittently moving the carrier to present said sets of mechanisms successively in work receiving position for introduction of an upper, power-operated means for operating each set so presented to shape the upper, and means operated by movement of the carrier for further shaping the upper.

29. In an upper shaping machine, the combination of a carrier, a plurality of sets of upper shaping mechanisms mounted on the carrier, power-operated means for intermittently moving the carrier to present said sets of mechanisms successively in work receiving position for introduction of an upper, power-operated means for operating each set so presented to shape the body portion of the upper, and means operated by movement of the carrier for flanging the upper.

30. In an upper shaping machine, the combination of a carrier, a plurality of sets of upper shaping mechanisms mounted on the carrier, power-operated means for intermittently moving the carrier to present said sets of mechanisms successively in work receiving position for introduction of an upper, power-operated means for operating each set so presented to shape the body portion of the upper, and means operated by movement of the carrier for forming a flange on the margin of the upper.

31. In an upper shaping machine, the combination of a carrier, a plurality of sets of upper shaping mechanisms mounted on the carrier, each set comprising molding means for shaping the rear portion of a shoe upper and wipers for forming a flange thereon, power-operated means for intermittently moving the carrier to present said sets of mechanism successively in upper receiving position, power-operated means for operating each set of molding means so presented to shape the upper, and means operated by movement of the carrier for operating the wipers to form the flange.

32. In an upper shaping machine, the combination of a carrier, a plurality of sets of upper shaping mechanisms on the carrier, each set comprising means for shaping one portion of an upper and means for shaping another portion of the upper, means for moving the carrier to present the sets successively in work receiving position for introduction of the upper, means for operating the means for shaping one portion of the upper while the carrier is at rest, and means operated during movement of the carrier for operating the means for shaping the other portion of the upper.

33. In an upper shaping machine, the combination of a carrier, a plurality of sets of upper shaping mechanisms on the carrier, each set comprising means for shaping the body portion of an upper and means for shaping the marginal portion of the upper, means for moving the carrier to present the sets successively in work receiving position for introduction of the upper, means for operating the means for shaping the body portion of the upper while the carrier is at rest, and means operated during movement of the carrier for operating the means for shaping the marginal portion of the upper.

34. In an upper shaping machine, the combination of a carrier, a plurality of sets of upper shaping mechanisms mounted on the carrier, each set including means for shaping the rear portion of a shoe upper and means for forming thereon an outturned flange, means for imparting intermittent movement to the carrier, means for operating the means for shaping the rear portion of the shoe upper while the carrier is at rest, and means actuated by movement of the carrier for operating the flange forming means.

35. In an upper shaping machine, the combination of a carrier, a plurality of sets of upper shaping mechanisms mounted on the carrier, each set including means for shaping the body portion of a shoe upper and means for forming the margin of the upper in angular relation to the body portion, means for imparting intermittent movement to the carrier, means for operating the means for shaping the body portion of the upper, and means for operating the margin forming means.

36. In an upper shaping machine, the combination of a turret, a plurality of sets of upper shaping mechanisms mounted on the turret, power-operated means for intermittently rotating the turret to present said sets of mechanisms successively in initial work receiving position for introduction of an upper, power-operated means for operating each set so presented to shape the upper, means operated by movement of the turret for further shaping the upper, and means operated by movement of the turret for restoring each shaping mechanism to initial position as it approaches work receiving position.

37. In an upper shaping machine, the combination of a carrier, a plurality of sets of upper shaping mechanisms mounted on the carrier, each set comprising cooperating members for shaping the body portion of an upper to the shape of the rear end of the shoe and means for forming the margin of the upper in angular relation to the body portion, power-operated means for intermittently moving the carrier to present each set of mechanisms successively in work receiving position for introduction of an upper, power-operated means for operating the cooperating members so presented to shape the body portion of the upper, and means for thereafter operating the margin forming means.

38. In an upper shaping machine, the combination of a carrier, a plurality of sets of upper shaping mechanisms mounted on the carrier, each set comprising cooperating members for shaping the body portion of an upper to the shape of the rear end of a last and means for forming the margin of the upper in angular relation to the body portion, power-operated means for intermittently moving the carrier to present each set of mechanisms successively in work receiving position for introduction of an upper, power-operated means for operating the cooperating members so presented to shape the body portion of the upper, and means controlled by movement of the carrier for operating the margin forming means.

39. In an upper shaping machine, the combination of a carrier, a plurality of sets of upper shaping mechanisms mounted on the carrier, each set including means for shaping the rear portion of a shoe upper and means for forming thereon an outturned flange, means for imparting intermittent rotation to the carrier, and means for operating the flange forming means.

40. In an upper shaping machine, the combination of a plurality of sets of upper shaping mechanisms mounted on the carrier, each set including means for shaping the rear portion of a shoe upper and means for forming thereon an outturned flange, means for imparting intermittent rotation to the carrier, and means actuated by movement of the carrier for operating the flange forming means.

41. In an upper shaping machine, the combination of a carrier, a plurality of sets of upper shaping mechanisms mounted on the carrier, each set comprising molding means for shaping the rear portion of a shoe upper and wipers for forming an outturned flange thereon, power-operated means for intermittently moving the carrier to present said sets of mechanisms in upper receiving position, power-operated means for operating each set of molding means so presented to shape the upper, and means operated by movement of the carrier for operating the wipers to form the outturned flange.

42. In an upper shaping machine, the combination of a carrier, a plurality of sets of upper shaping mechanisms mounted on the carrier, each set comprising cooperating members for shaping the body portion of an upper to the shape of the rear end of the shoe and means for forming the margin of the upper in outturned relation to the body portion, means for intermittently moving the carrier to present each set of mechanisms successively in work receiving position for introduction of an upper, means for operating the co-operating members so presented to shape the body portion of the upper, and means for thereafter operating the margin forming means to turn the margin outwardly.

43. In an upper shaping machine, the combination of a carrier, a plurality of sets of upper shaping mechanisms mounted on the carrier, each set comprising cooperating members for shaping the body portion of an upper to the shape of the rear end of the shoe, means for forming the margin of the upper in outturned angular relation to the body portion, power-operated means for intermittently moving the carrier to present each set of mechanisms successively in work receiving position for introduction of an upper, power-operated means for operating the co-operating members so presented to shape the body portion of the upper, and means controlled by movement of the carrier for operating the margin forming means to turn the margin outwardly.

44. In an upper shaping machine, the combination of a turret, a plurality of sets of upper shaping mechanisms arranged about the periphery of the turret, each set comprising one part adapted to shape the body portion of an upper and another part to shape the margin of the upper, power-operated means for intermittently rotating the turret to present the shaping mechanisms in work receiving position for introduction of an upper, power-operated means for operating one part of each shaping mechanism while the turret is at rest with the shaping mechanism in work receiving position, means for operating the other part of said shaping mechanism when the turret is rotated, and means for maintaining both parts of said shaping mechanism in upper shaping position during successive movements of the turret and until said mechanism again approaches work receiving position.

45. In an upper shaping machine, the combination of a turret, a plurality of sets of upper shaping mechanisms arranged about the periphery of the turret, each set comprising one part adapted to shape the body portion of an upper and another part to shape the margin of the upper outwardly of the body portion, power-operated means for intermittently rotating the turret to present the shaping mechanisms in work receiving position for introduction of an upper, power-operated means for operating the part of the shaping mechanism which shapes the body portion of the upper while the turret is at rest with the shaping mechanism in work receiving position, means for operating the part of said shaping mechanism which shapes the margin of the upper when the turret is rotated, and means for maintaining both parts of said shaping mechanism in upper shaping position during successive movements of the turret and until said mechanism again approaches work receiving position.

46. In a machine for shaping shoe uppers, the combination of a turret mounted for rotation on a horizontal axis, a series of sets of upper shaping mechanisms mounted on the turret, each set comprising an inner form and an outer mold, means for rotating the turret to bring the sets of shaping mechanisms into upper receiving position, means for moving the outer mold in a direction parallel to said axis to shape the upper about the form, and means on the opposite side of the turret for opposing the thrust of the outer mold.

47. In a machine for shaping shoe uppers, the combination of a turret mounted for rotation on a horizontal axis, a series of sets of upper shaping mechanisms mounted on the turret, each set comprising an inner form and an outer mold, means for rotating the turret to bring the sets of shaping mechanisms into upper receiving position, means for relatively moving the inner form and the outer mold in a direction parallel to said axis to shape the upper about the form, and means on the opposite side of the turret for counteracting the side thrust on the turret axis.

48. In an upper shaping machine, the combination of a turret, a plurality of sets of upper shaping mechanisms on the turret, means for rotating the turret to present the sets successively in upper receiving position for introduction of an upper, means for operating each set so presented and while it is in said position to shape the upper, means for operating each set when it is moved by the turret to another position, and means acting on the shaping means at the opposite side of the turret for counterbalancing the thrust of said operating means.

49. In a machine for shaping shoe uppers, the combination of a fixed inner form, a two-part outer mold constructed and arranged for bodily movement relatively to the form and having its parts arranged for relative closing movement, a slide for bodily moving the mold, springs between the slide and the mold parts to cause the mold to be pressed against the rear part of the form, levers pivoted on the slide with their front ends arranged to engage the sides of the mold and with their rear ends inturned, and means fixed as to movement with the levers for engaging the rear ends of the levers during their movement with the slide to operate them to close the mold.

50. In a machine for shaping shoe uppers, the combination of a fixed inner form, a two-part outer mold constructed and arranged for bodily movement relatively to the form and having its parts arranged for relative closing movement, a slide for bodily moving the mold, springs between the slide and the mold parts to cause the mold to be pressed against the rear part of the form, levers pivoted on the slide with their front ends arranged to engage the sides of the mold and with their rear ends inturned, and yielding means for engaging the rear ends of the levers during their movement with the slide to separate them and close the mold.

51. In a machine for shaping shoe uppers, the combination of a fixed inner form, a two-part outer mold constructed and arranged for bodily movement relatively to the form and having its parts arranged for relative closing movement, a slide for bodily moving the mold, springs between the slide and the mold parts to cause the mold to be pressed against the rear part of the form, levers pivoted on the slide with their front ends arranged to engage the sides of the mold and with their rear ends inturned, a pair of arms, and a spring between the arms, said arms being arranged to engage the rear ends of the levers during their movement with the slide and to separate them to close the mold.

52. In an upper shaping machine, the combination of a form, mold members cooperating with the form to shape the rear portion of a shoe upper positioned with its margin extending beyond the mold members, means for operating the mold members to shape the upper to the form, pivoted wipers located in proximity to the tread face of the form in such position that their rear portions will initiate the turning of the rear portion of the margin of the upper outwardly, and means for separating the wipers and moving them rearwardly of the form to complete the turning of the margin of the upper outwardly over the mold members.

53. In an upper shaping machine, the combination of a form, mold members cooperating with the form to shape an end portion of a shoe upper positioned with its margin extending beyond said members, flange forming means, means for relatively operating the mold members and the flange forming means to initiate the formation of a flange at the end of the form, means for operating the flange forming means to complete the formation of the flange, and means for operating the flange forming means to press the flange.

54. In an upper shaping machine, the combination of a form, mold members cooperating with the form to shape an end portion of a shoe upper positioned with its margin extending beyond said members, wipers for engaging the margin of the upper and initially positioned over the form in proximity thereto, means for relatively operating the mold members and the wipers to initiate the formation of an outturned flange at the rear end of the form, means for operating the wipers to complete the formation of the outturned flange, and means for operating the wipers to press the flange.

55. In a machine of the class described, a carrier, a plurality of sets of mold members mounted on the carrier, a single means for operating the sets of mold members successively after each has been brought to one position by movement of the carrier, and additional means for maintaining each set of mold members in molding relation when moved from said position.

56. In an upper shaping machine, a plurality of sets of upper shaping devices mounted upon a carrier, each set including inner and outer mold members constructed and arranged for relative movement to shape an upper between them, means for operating each set of mold members in one position of the carrier, and means for maintaining the mold members in operative relation to the form when moved from said position by the carrier.

57. In a machine of the class described, a carrier, a plurality of sets of mold members mounted on the carrier, said sets being brought by movement of the carrier to a work receiving position, power-operated means for operating each set of mold members while it is in work receiving position, and additional means for maintaining each set of mold members in molding relation when it is moved by the carrier from said receiving position.

58. In an upper shaping machine, the combination of an endless carrier, a plurality of sets of upper shaping mechanisms on the carrier, means for moving the carrier to present the sets successively and repeatedly in work receiving position for introduction of an upper, means for operating each set so presented while in said position to shape the upper, and means for maintaining the upper shaping means in shaping position during successive movements of the carrier.

59. In an upper shaping machine, the combination of an endless carrier, a plurality of sets of upper shaping mechanisms on the carrier, means for moving the carrier to present the sets successively and repeatedly in work receiving position for introduction of an upper, means for operating each set so presented while it is in said position to shape the upper, means for maintaining the upper shaping means in shaping position until it approaches work receiving position again, and means for releasing the shaping mechanism as it approaches work receiving position.

60. In an upper shaping machine, the combination of a carrier, a plurality of sets of upper shaping mechanisms on the carrier, means for moving the carrier to present the sets successively into work receiving position for introduction of an upper, means for operating each set so presented and while in said position to shape the upper, additional means for maintaining each set in upper shaping position when it is moved by the carrier to another position, and means operated during such movement of the carrier for further shaping the upper.

61. An upper shaping machine having, in combination, an endless carrier, means for moving the carrier step by step, a plurality of sets of upper shaping mechanisms on the carrier each comprising a form and mold members cooperating therewith to shape the end portion of an upper positioned with its margin extending beyond the mold members and means for forming the extending margin into an outturned flange, means for operating the mold members as they are presented in succession by movement of the carrier, means for effecting movement of the flange forming means heightwise of the molds to press the flange, and means operated by said means for maintaining the mold members in operative relation to the form during successive movements of the carrier.

62. In an upper shaping machine, a carrier, a plurality of sets of upper shaping devices mounted on the carrier, each set including inner and outer mold members constructed and arranged for closing movement to shape an upper between them, means for moving the carrier intermittently, means for operating each set of mold members when brought into one position by movement of the carrier, means for holding the carrier from movement during operation of said operating means, and means for maintaining the mold members in operative relation to the form when moved from said position by the carrier.

63. In an upper shaping machine, the combination of a movable carrier, a plurality of sets of upper shaping devices on the carrier, each set including an inner form to which the upper is to be shaped and mold members constructed and arranged to close about the form to shape the upper to the form, means for operating each set of mold members when presented by movement of the carrier in upper receiving position, means operated by movement of the carrier for maintaining the mold members in operative relation to the form, means for holding the carrier against movement while the mold members are operated, means for releasing the holding means, and means for moving the carrier to present another set of shaping devices in upper receiving position.

64. In an upper shaping machine, the combination of a turret, a plurality of sets of upper shaping devices mounted on the turret, each set including an inner form to which the upper is to be shaped and mold members constructed and arranged to close about the form to shape the upper to the form, means for operating each set of mold members when presented by movement of the turret in an upper receiving position, and means operated by movement of the turret for maintaining the mold members in operative relation to the form.

65. In an upper shaping machine, a turret, a plurality of sets of upper shaping devices mounted on the turret, each set including inner and outer mold members constructed and arranged for relative movement to shape an upper between them, means for rotating the turret step by step to present each set successively in upper receiving position, means for operating each set of mold members when brought into said position by a movement of the turret, and means for maintaining the mold members in operative relation to the form when moved from said position by the turret.

66. In a machine for shaping shoe uppers, the combination of a turret, a series of sets of upper shaping mechanisms mounted on the turret, each set comprising an inner form fixed to the turret and a two-part outer mold, said mold being constructed and arranged for bodily movement and its parts for relative closing movement, means for moving the molds bodily to press the upper against the rear end of the form, means for closing the mold parts against the form to shape the upper to the sides of the form, and means for varying the time of closure of the mold relatively to its bodily movement.

67. In a machine for shaping shoe uppers, the combination of a turret, a series of sets of upper shaping mechanisms mounted on the turret, each set comprising an inner form fixed to the turret and a two-part outer mold, said mold being constructed and arranged for bodily movement and its parts for relative closing movement, means for moving the molds bodily to press the upper against the rear end of the form, means for closing the mold parts against the form to shape the upper to the sides of the form, and adjustable means accessible to the operator at the front of the machine for varying the time of closure of the mold relatively to its bodily movement.

68. In an upper shaping machine, the combination of a turret, a plurality of sets of upper shaping mechanisms mounted on the turret, each set including means for shaping the body portion of a shoe upper and means for forming the margin of the upper in angular relation to the body portion to form a flange, means for imparting intermittent movements to the turret, means for operating the means for shaping the body portion of the upper, means for operating the margin forming means to form the flange on the upper, and means for operating the flange forming means to press the flange.

69. In an upper shaping machine, the combination of a turret, a plurality of upper shaping mechanisms mounted on the turret, each set including a mold for shaping the body portion of a shoe upper and wipers for forming the margin of the upper into an outturned flange, means for imparting intermittent movements to the turret, means for operating the molds to shape the body portion of the upper, means for operating the wipers to form the flange, and means for operating the wipers to press the flange.

70. In an upper shaping machine, the combination of a turret, a plurality of sets of upper shaping mechanisms mounted on the turret, each set including means for shaping the body portion of a shoe upper and means for forming the margin of the upper in angular relation to the body portion to form a flange, means for imparting intermittent movements to the turret, means for operating the means for shaping the body portion of the upper while the turret is at rest, means for operating the flange forming means during movement of the turret to form the margin into a flange, and means for simultaneously relatively operating the margin forming means and the body shaping means to press the flange.

71. In an upper shaping machine, the combination of a turret, a plurality of sets of upper shaping mechanisms mounted on the turret, each set including a mold for shaping the body portion of a shoe upper and means for forming the margin of the upper in angular relation to the body portion to form a flange, means for imparting intermittent movements to the turret, rotary means for operating the mold to shape the body portion of the upper during a dwell of the turret, means for operating the flange forming means during movement of the turret to form the margin into a flange, and means for simultaneously relatively operating the margin forming means and the mold radially of the turret to press the flange.

72. In an upper shaping machine, the combination of a form, mold members cooperating with the form to shape the rear portion of a shoe upper positioned with its margin extending beyond the mold members, means for forming the extending margin into a flange and pressing the flange, means for operating the mold members, and means operated by the flange pressing means for maintaining the mold members in upper shaping position.

73. In an upper shaping machine, the combination of a form, mold members cooperating with the form to shape the rear portion of a shoe upper positioned with its margin extending beyond the mold members, wipers constructed and arranged for relative movement to form the extending margin into a flange and for bodily movement to press the flange, means for operating the wipers to form the flange, means for effecting bodily movement of the wipers to press the flange, means for operating the mold members, and means operated by the means for effecting bodily movement of the wipers for maintaining the mold members in upper shaping position.

74. In an upper shaping machine, the combination of a form, mold members cooperating with the form to shape an end portion of a shoe upper positioned with its margin extending beyond said members, means for forming the extending margin into a flange and for pressing the flange, means for relatively operating the form and mold members to shape said end portion, means for operating the flange forming means to press the flange, and means rendered operative by operation of the means for operating the flange forming means for maintaining the mold members in upper shaping position.

75. In an upper shaping machine, the combination of a turret mounted to turn in a vertical plane, a series of forms to each of which an upper is to be shaped, a support for each form extending radially of the turret from the tread face of the form and then rearwardly, said support being fixed to the turret, means for rotating the turret to bring each form to an upper receiving position such that an upper may be placed about the form by movement of the upper heightwise of the form toward its tread face, molding means cooperating with each form, and means for operating the molding means in succession.

76. In an upper shaping machine, the combination of a turret mounted to turn in a vertical plane, a series of forms to each of which an upper is to be shaped, a support for each form extending radially of the turret from the tread face of the form and then rearwardly, said support being fixed to the turret, means for rotating the turret, the upper being positioned about the form by movement of the upper radially of the turret, molding means cooperating with each form, and means for operating the molding means in succession.

77. In an upper shaping machine, the combination of upper shaping means, flange forming means, gripping members on the flange forming means, gripping members cooperating therewith to hold the upper including the wings of the counter in position during the action of the upper shaping means, and means operated by movement of the upper shaping means for operating the gripping members.

78. In an upper shaping machine, the combination of upper shaping means, flange forming means, gripping members on the flange forming means, gripper levers cooperating with said members, and means for operating the levers to grip the upper in the region of the wings of the counter during the initial portion of the action of the shaping means and then release them.

79. In an upper shaping machine, the combination of upper shaping means, flange forming means, gripper members on the flange forming means, gripper jaws cooperating therewith to hold the margin of the upper including the wings of the counter in position during the movement of the upper shaping means and then releasing the margin, and means for thereafter operating the flange forming means to form the margin of the upper into a flange.

80. In an upper shaping machine, the combination of upper shaping means comprising a form, mold members adapted to close about the form, a slide for actuating the mold members, flange forming means constructed and arranged to form the margin of the upper extending beyond the mold members into an outturned flange, gripping means cooperating with the flange forming means to hold the wings of the counter in position during the closing of the mold, and means operated by the mold slide for causing said gripping means first to hold the upper and then release it to permit operation of the flange forming means.

81. In an upper shaping machine, the combination of upper shaping means, flange forming means, gripper members on the flange forming means, gripper levers cooperating with said members, means for operating the levers to grip the margin of the upper in the region of the wings of the counter during the initial portion of the movement of the shaping means and then to release them, and means for operating the flange forming means to turn outwardly the margin of the upper.

82. In an upper shaping machine, the combination of means for shaping the rear portion of an upper, a slide for operating the upper shaping means, flange forming means, gripper members on the flange forming means, gripper levers cooperating with said members, means on the slide for operating the gripper levers to grip the upper in the region of the wings of the counter during the initial portion of the movement of the slide and then to release them, and means on the slide for restoring the gripper levers to initial position when the slide is retracted.

83. In an upper shaping machine, the combination of upper shaping means comprising a form, molding means adapted to shape an upper to the form, the margin of the upper extending beyond the form and molding means, a slide for actuating said molding means, flange forming means constructed and arranged to form the margin of the upper into an outturned flange, gripping means cooperating with the flange forming means to hold the wings of the counter in position, means operated by the slide for causing said gripping means first to hold the upper and then release it to permit operation of the flange forming means, and means for operating the flange forming means to turn the upper outwardly.

84. In an upper shaping machine, the combination of an inner form having the rearwardly convex shape which it is desired to impart to the rear portion of a shoe upper, flange forming means arranged to engage the margin of an upper projecting beyond the tread face of the form, said flange forming means being located with its rear end in alinement with the apex of the convexity of the rear end of the form and in position to engage the projecting margin of the upper, and means for shaping the upper about the rear end of the form and for gathering it inwardly about the tread face of the form, the flange forming means preventing the margin of the upper from responding to the pressure of the upper shaping means and causing the formation of an outturned flange at the rear end of the shoe to be initiated.

85. In an upper shaping machine, the combination of an inner form having the rearwardly convex shape which it is desired to impart to the rear portion of a shoe upper, wipers arranged to engage the margin of an upper projecting beyond the tread face of the form, said wipers being located with their rear ends in alinement with the projecting portion at the rear end of the form, and means for shaping the upper about the rear end of the form in the plane of its tread face to initiate the formation of an outturned flange at the rear end of the shoe.

86. In an upper shaping machine, the combination of an inner form having the rearwardly convex shape which it is desired to impart to the rear portion of a shoe upper, wipers arranged to engage the margin of an upper projecting beyond the tread face of the form, said wipers being located with their rear ends in alinement with the projecting portion at the rear end of the form, means for shaping the upper about the rear end of the form in the plane of its tread face to initiate the formation of an outturned flange at the rear end of the shoe, and means for operating the wipers to complete the formation of the flange at the rear end of the form and to form the side portion of the margin of the upper into an outturned flange.

87. In an upper shaping machine, the combination of a form to which the rear portion of an upper is to be shaped, a support fixed to the form extending outwardly from its tread face and then rearwardly, free access to the form being thus afforded to enable an upper to be placed about the form and moved toward the tread face of the form, and mold members arranged for forward and closing movement relatively to the form to shape the upper about the form.

88. In an upper shaping machine, the combination of a form having the shape which it is desired to impart to the rear portion of the shoe upper, a support for the form which is above the form and extends downwardly when the form is located with its tread face uppermost, the form being fixed to the lower end of the support, free access being thus given to the form for presenting an upper thereto by an upward movement of the upper, and means for shaping the upper to the form.

89. In an upper shaping machine, the combination of a form to which the rear portion of an upper is to be shaped, a support for the form extending outwardly from its tread face and then rearwardly of the form, said support being thin laterally of the form and secured thereto, free access to the form being thus afforded to enable an upper to be placed about the form by moving it toward the tread face of the form, molding means, and means for relatively moving the molding means and form to shape the upper to the form.

In testimony whereof I have signed my name to this specification.

RENÉ E. DUPLESSIS.